Sept. 19, 1967  B. I. KJELLBERG  3,342,976
OVEN CONTROL SYSTEM
Filed June 8, 1965  3 Sheets-Sheet 1

INVENTOR
BURRE I. KJELLBERG
BY
*Frank Broom Kirtz*
ATTORNEY

Sept. 19, 1967  B. I. KJELLBERG  3,342,976
OVEN CONTROL SYSTEM
Filed June 8, 1965  3 Sheets-Sheet 3

INVENTOR
BURRE I. KJELLBERG
BY
ATTORNEY

United States Patent Office 3,342,976
Patented Sept. 19, 1967

3,342,976
OVEN CONTROL SYSTEM
Burre I. Kjellberg, Ballwin, Mo., assignor to Diatemp, Inc., St. Louis, Mo., a corporation of Missouri
Filed June 8, 1965, Ser. No. 462,338
5 Claims. (Cl. 219—413)

ABSTRACT OF THE DISCLOSURE

A hydraulic temperature control for an oven chamber operating at temperatures above the breakdown temperature of the hydraulic fluid, having one hydraulic bulb in contact with a high temperature chamber and a second hydraulic bulb connected in series with the first bulb, but not in contact with the high temperature chamber.

---

It is a general object of the present invention to provide a novel method of controlling the temperature of a household cooking oven.

Another general object of the present invention is to provide a control system for a household oven which will control the temperature of the oven when the oven is cleaned by the process of elevating the internal temperature to a heat-cleaning level. In 1964 Patent No. 3,121,158 was issued to Bohdan Hurko. This patent provides a method of cleaning from the interior surfaces of an oven liner which defines an oven cavity food soils accumulated therein. These food soils are accumulated by the process of carrying out in the oven cavity normal food cooking operations which are in the normal food cooking temperature range which may be said to extend from about 150° Fahrenheit to approximately 550° Fahrenheit. In the normal cooking oven used in households the inner liner of the oven is enclosed by and heat-insulated from the so-called outer casing. The method and structure of Hurko in Patent No. 3,121,158 consists of supplying into the oven cavity during a sufficiently short time interval sufficient heat to elevate the temperature of the inner liner into the heat-cleaning temperature range which is defined as extending from about 750° Fahrenheit to about 950° Fahrenheit. By the use of sufficient insulation and an electric fan, Hurko details a structure which will accomplish his oven-cleaning aims without elevating the temperature of the outer casing above some 194° Fahrenheit. This latter requirement is necessary to avoid the possibility of injury to a housewife who might touch the outer surface of the oven, as well as to avoid damaging the painted outer surfaces of the oven.

During the past several years many attempts have been made to utilize heat to clean the inner surfaces of ovens. The convenience is a striking feature when the cleaning is accomplished automatically, for one of the most disagreeable tasks for a housewife is that of scraping and gouging off the accumulated residues of various dishes which have been cooked in the oven. Ordinary scrubbing, washing with wire brushes and detergents requires a very long effort since the residues are of a glue-like nature.

The residues of such food soils which have been repeatedly exposed to broiling, baking as well as the accidents of spills, boil-overs and the like are found, in general to comprise carbohydrates, fatty acids, fats and proteins. Now carbohydrates are normally classified as monosaccharides such as glucose, fructose and the like, whereas polysaccharides which are also carbohydrates are composed of such compounds as sucrose, lactose, starch, cellulose and the like.

Fatty acids are generally treated as two classes, the saturated and the unsaturated. Examples of saturated fatty acids would be capric, lauric, palmitic, stearic, et cetera. On the other hand examples of unsaturated fatty acids would be the typical acids such as palmitoleic, oleic, linoleic and the like.

Fats of course are the salts of such fatty acids and these are referred to as the esters of the corresponding acids mentioned above.

Proteins are much more complicated compounds. Proteins which are commonly found in cooking are largely made of amino acids. Common examples are glycine, alanine, cystine and the like, although a more subtle analysis would show that many variations and related compounds are present in even the common roast or in a chicken or turkey.

The principal point however is that the oven manufacturers have realized a fact that has been known for a long time, namely that all the above complex range of compounds may be decomposed or destroyed by high heat. A temperature of from 750° Fahrenheit to about 950° Fahrenheit for a time interval from two to three hours will clean the ordinary oven and leave only the tiniest trace of a white ash which can be wiped off the bottom of the oven liner. The decomposition of these compounds, all of which are organic in nature, results in the degradation of these compounds to elementary organic gases such as methane, ethane, water vapor, carbon dioxide and a little free carbon, which takes the form of the white or grey ash mentioned above.

The present method of cleaning such ovens is therefore to provide an input of some 120 to 180 British thermal units (B.t.u.) per minute. During the heat-cleaning cycle the total heat supplied to the oven cavity is in the general range of some 10,000 to some 25,000 B.t.u., the normal figure for an ordinary oven construction being approximately 15,000 B.t.u. Of course it is understood that the maximum temperature within the oven chamber must not exceed some 950° Fahrenheit, otherwise with the best present insulations employed, such as Fiberglas insulation, the external temperature of the oven may rise to a point at which the paint on the outside may blister or the housewife may receive a bad burn by accidently touching the outside of the oven during the cleaning cycle.

Conversely, the minimum temperature within the oven chamber must not fall below the level of some 750° Fahrenheit, since the cleaning process, that is the decomposition and degradation of the organic compounds which comprise the residues accumulated from cooking the normal foods in the oven do not break down the residues either fully or completely below that level of 750° Fahrenheit.

The units used to control the ovens manufactured under the Patent No. 3,121,158 are relatively expensive electrical control units. It is obvious that the control system used to control the temperatures of the oven chamber must first accurately control the oven during ordinary cooking, and then also be able to control the oven during the elevated temperatures of the heat-cleaning cycle.

Hydraulic diaphragm manufacturers have been unable to enter this field of oven control because of the temperatures involved in the heat-cleaning cycle. While they would like to do so, and while oven manufacturers would welcome the use of dependable and more inexpensive hydraulic diaphragm control systems, such as are common in the field, there has appeared to be no way to make an hydraulic diaphragm control system which would accomplish the purposes of the higher temperature cleaning cycles. This may be understood to be a serious impasse since the cost of a hydraulic diaphragm control system is about one-fourth or one-fifth the cost of the electrical control system to the manufacturer as presently used.

The principal difficulty is that none of the common and accepted filler fluids used in hydraulic diaphragm control systems are stable at temperatures above 750° Fahrenheit, which is the minimum temperature below which the decomposition of the food residues takes place. The reason for this is simple. The fillers employed are organic compounds, which break down just like the other organic compounds which are used in foods.

Various expedients have been proposed. Among them, that mercury be used as a filler for the hydraulic diaphragms. This is not considered to be satisfactory, although mercury remains fluid at normal temperatures and would operate satisfactorily in an hydraulic diaphragm. The reason it is not acceptable is that the underwriter laboratories which approve all such devices for use in the household consider that the danger of a leakage of mercury vapor is much greater than can be overweighed by the advantages of its use.

Consequently one of the principal objects of my invention is to provide a construction for an oven control system which will utilize the ordinary organic fillers commonly employed in oven control, and which fillers break down at various temperatures up to 700° Fahrenheit. The novelty or essence of my invention is that I employ such fillers to regulate and control the operation of oven chambers at temperatures above 700° Fahrenheit, which is the ultimate breakdown point of such organic filling liquids.

Another object of my invention is to provide a cheaper, more efficient hydraulic diaphragm control system for ovens utilizing a heat-cleaning cycle in the range from 750° Fahrenheit to 950° Fahrenheit.

An additional object of my invention is to provide an oven control system in which the temperature within the oven chamber is controlled by a thermostat device which is outside the chamber. This is a complete departure from practice. It is equivalent to controlling the temperature of a house by placing the thermostat outside the house. The concept is so radical in the thermostat art that thermostat engineers who hear it for the first time consider that it is impossible that the system should work.

A further object of my invention is to provide an oven control system in which the chamber of the oven does not contain a thermostat device. In my invention the customary hydraulic diaphragm bulb is removed from the oven chamber and is instead placed outside the rear or side wall of the oven. This means that the diaphragm bulb is never in the way of the person using the oven, whether cleaning it or cooking with it.

In the drawings I have shown a preferred embodiment of my invention and a set of graphs which illustrate the remarkable features of the invention. It will be understood that my invention is not limited to the particular structures shown in the drawings and that it may be adapted for use in connection with the control of temperatures of ovens which do not peroform cleaning tasks, as well as in connection with the control of temperatures in devices other than ovens.

Figure 3:
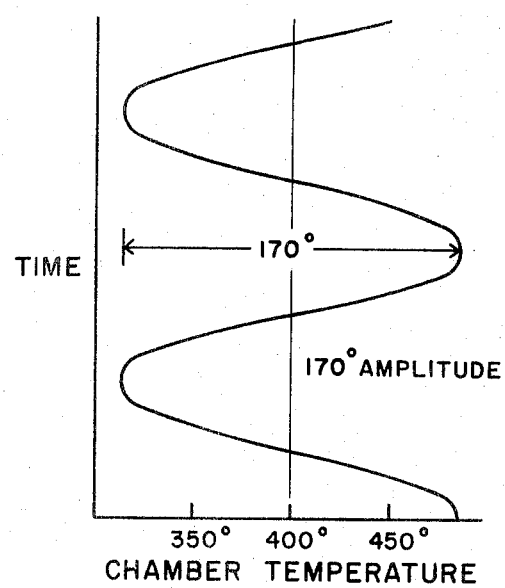
FIGURE 3 is a graph made of the chamber temperature of an empty oven, with the oven control set at 400° Fahrenheit, and with the diaphragm bulb located outside the oven chamber, with no "booster" bulb employed, and with the chamber temperature measured by thermocouples placed in the chamber, the temperature being plotted against time.
Figure 4:
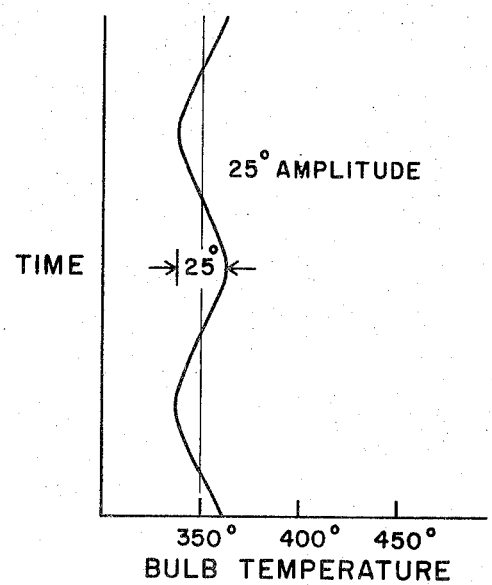

FIGURE 4 consists of a plot of temperature against time for the temperature of the diaphragm bulb located outside the oven chamber in FIGURE 3 conditions; consequently FIGURES 3 and 4 should be considered together as representing different measurements for the same physical setup. The bulb temperature in FIGURE 4 is measured by thermocouples on the bulb.

Figure 5:
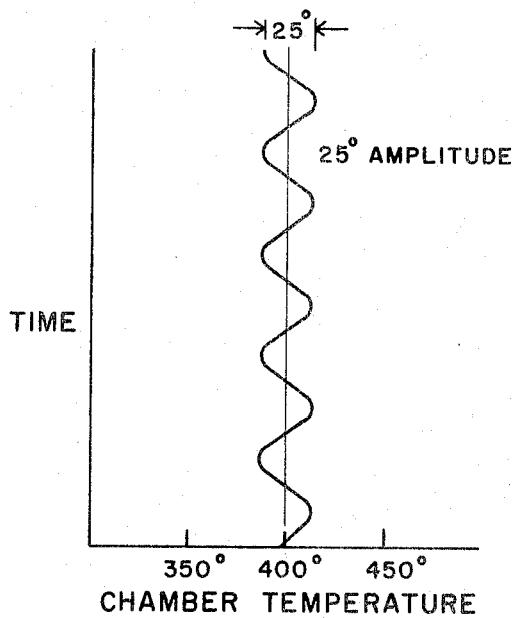
Figure 6:
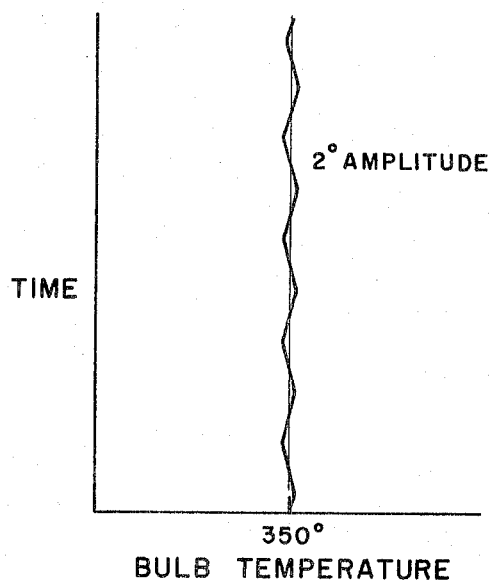
Figure 7:
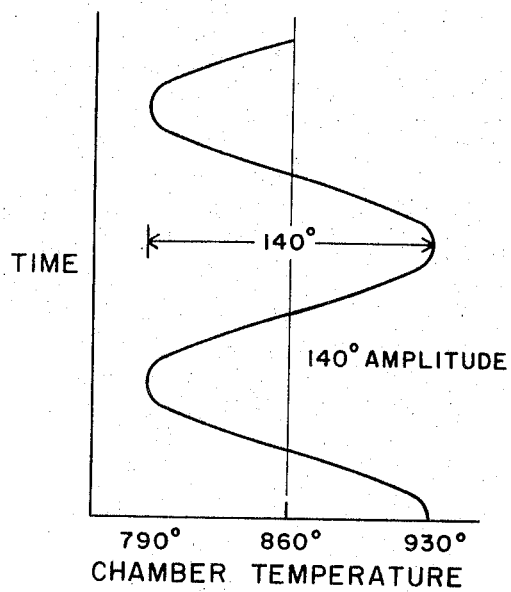
Figure 8:
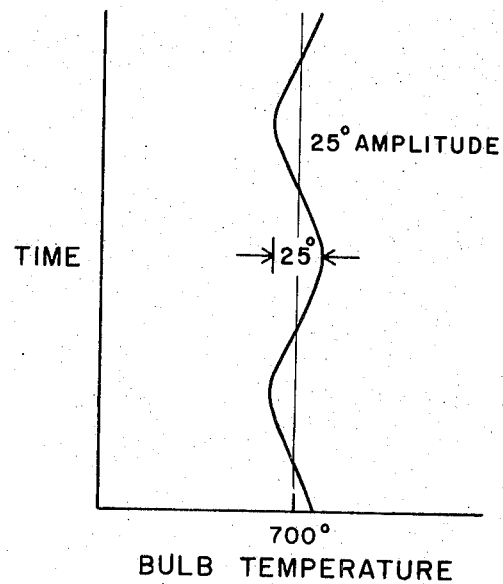
Figure 9:
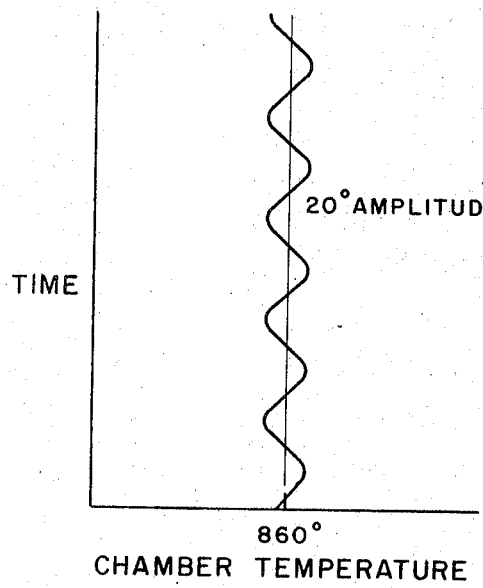
Figure 10:
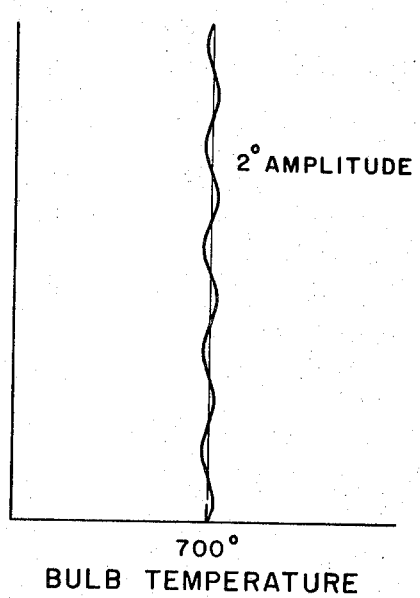

FIGURE 5 is a graph of the chamber temperature of an empty oven, with the oven control set at 400° Fahrenheit, under the conditions that the diaphragm bulb is located outside the oven chamber, while a "booster" bulb is employed; the chamber temperature is measured by thermocouples placed in the chamber, the temperature being plotted against time;

FIGURE 6 consists of a plot of temperature against time for the temperature of the diaphragm bulb located outside the oven chamber under the conditions of FIGURE 5, consequently FIGURES 5 and 6 should be considered together as representing the same physical setup. The bulb temperature in FIGURE 6 is measured by thermocouples on the bulb which is located outside the chamber, and not on the "booster" bulb;

FIGURE 7 refers to the heating cycle. It is a graph of the chamber temperature of an empty oven, with the oven control set at 860° Fahrenheit, under the conditions that the diaphragm bulb is located outside the oven chamber, while no "booster" bulb is employed;

FIGURE 8 refers to the heating cycle likewise. It is a plot of temperature against time for the temperature of the diaphragm bulb located outside the oven chamber under the conditions of FIGURE 7. Consequently FIGURES 7 and 8 should be considered together as representing the same physical setup. The bulb temperature in FIGURE 8 is measured by thermocouples on the bulb which is located outside the chamber;

FIGURE 9 again refers to the heating cycle. It is a plot of temperature against time for the temperature of an empty oven, with the oven control set at 860° Fahrenheit, under the conditions that the diaphragm bulb is located outside the oven chamber, while a "booster" bulb is employed; the chamber temperatures are measured by thermocouples placed in the chamber, the temperature being plotted against time;

FIGURE 10 refers to the heating cycle likewise. It consists of a plot of temperature against time for the temperature of the diaphragm bulb located outside the oven chamber under the conditions of FIGURE 9, consequently FIGURES 9 and 10 should be considered together as representing the same physical setup. The bulb temperature in FIGURE 6 is measured by thermocouples on the bulb which is located outside the chamber, and not on the "booster" bulb.

Figure 1:
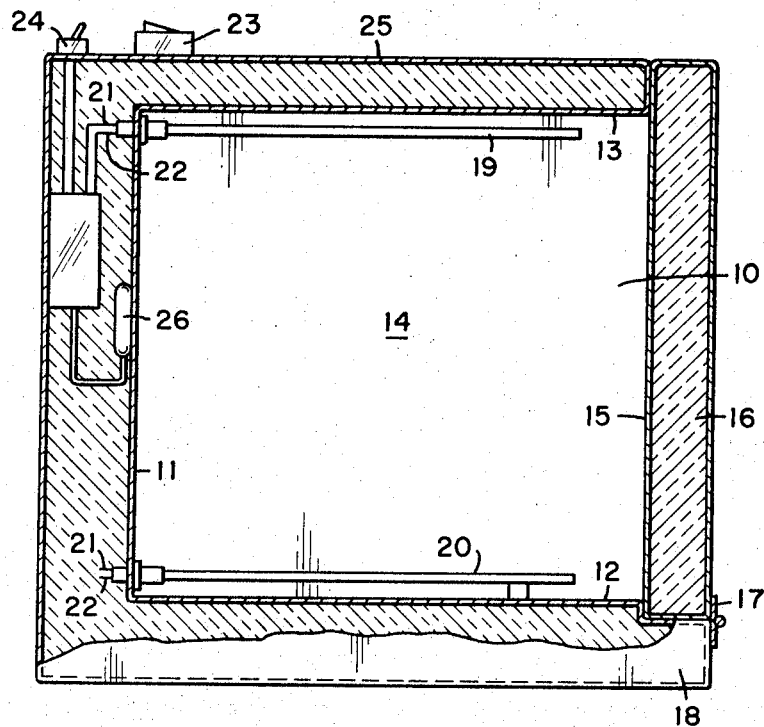
FIGURE 1 is a side elevational view, partly broken away and partly in section, of a household cooking oven embodying the present invention.

Referring now to FIGURE 1, the numeral 10 is given to the oven chamber. Chamber 10 is formed by the rear wall 11, bottom wall 12, top wall 13, the side wall 14 and the front wall 15. The front wall 15 is a part of the oven door 16, which is hinged by the hinge 17 upon the oven body 18. The space betwen the front wall and the outside of the door 16 is filled with fiber glass insulation as is the space surrounding the rear wall 11, bottom wall 12, top wall 13, and the side wall 14, which serves to contain the heat input to the oven to the oven chamber 10, in the conventional manner.

An upper or broil electric heating unit is illustrated as 19. The broil electric heating unit is removably arranged in the upper portion of the oven chamber 10 adjacent to the top wall 13. A lower or bake electric heating unit 20 is removably arranged in the lower portion of the oven chamber 10, adjacent to the bottom wall 12, and mounted upon insulating blocks so as to be insulated therefrom.

Each electric heating unit terminates at two terminals, which being alike and interconnected are given like numbers 21 and 22. The temperature control 23 setting for the oven chamber is accomplished by means of the dial knob, which is entirely customary and conventional in nature, as will be familiar to those skilled in the art.

In addition I provide a manual control switch 24, which is a simple selector switch. Both temperature control knob 23 and the manual control switch 24 are motnted on the upper surface of the oven 25. I prefer to illustrate a simple embodiment of my oven, however it will be obvious to those skilled in the art that an oven used for high temperature cleaning should have a door latch, a safety measure so that no one can be inadvertently exposed to the high temperature in the oven chamber during the cleaning cycle.

Similarly it will be obvious to those skilled in the art that the thickness of the fiberglas insulation used in the oven which is to be cleaned by high temperature, must be greater than is customary in normal cooking usage. However all of these details are outlined in Patent 3,121,158 to Hurko, mentioned above, and are consequently omitted from this description.

It will be noted that in FIGURE 1 the oven hydraulic diaphragm bulb 26 is placed outside the oven chamber 10. This is entirely in contradiction to the established practice of the oven control art and to all the teachings of that art.

Figure 2:
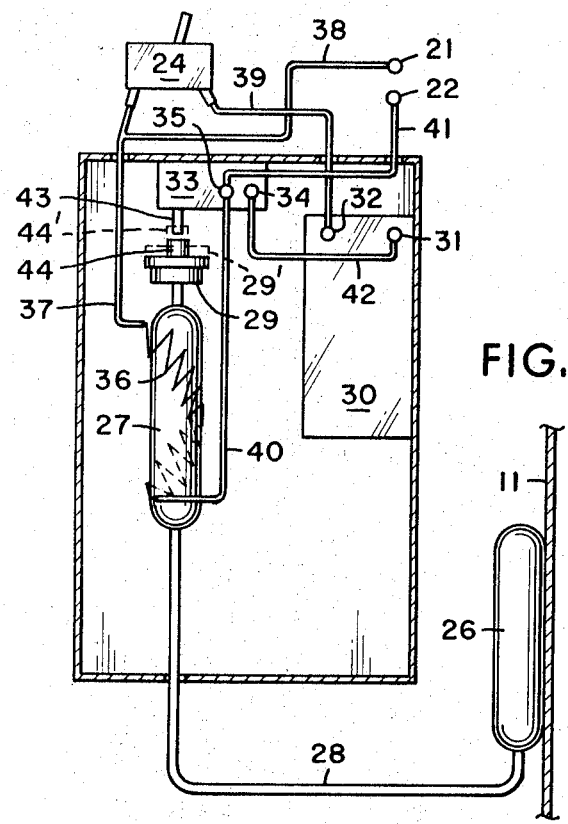
FIGURE 2 is an enlarged detail of a portion of FIGURE 1.

In FIGURE 2 I show the oven control system in greater detail. The rear wall of the oven 11 is shown in part, with the diaphragm bulb 26 attached to the outside of said wall 11. In my copending patent application Number 424,971, filed on Jan. 12, 1965, and titled: "A Fluid Expansion Thermostat System," I disclose and illustrate a use of what I have there called a "booster" bulb.

My "booster" bulb is a second bulb which I use in series with a given diaphragm bulb. It, like the normal diaphragm is filled with hydraulic fluid in the conventional manner. However I provide an auxiliary electrical circuit which goes into action when the hydraulic fluid circuit turns on the electrical power supply. Thus the auxiliary electrical circuit is activated, a resistance element is heated in close proximity to the "booster" bulb and the "booster" bulb increases the action in the hydraulic circuit.

The "booster" bulb in FIGURE 2 is numbered 27. The booster bulb is linked hydraulically to the normal diaphragm bulb by the tube 28. Also hydraulically to the booster bulb is the diaphragm 29. The diaphragm is well known in the art. In consists of two nested corrugated discs, which spread apart and come together in response to volumetric variations in the hydraulic circuit connecting the diaphragm 29 to the bulbs 26 and 27, as the temperature of the fluid in those bulbs varies. Such diaphragms are shown in Patents Nos. 2,307,636 and 2,607,533.

In FIGURE 2 I show my power supply 30, which is a source of electrical energy and provided with two output terminals 31 and 32. I also provide a micro switch 33, likewise provided with two terminals 34 and 35. Wrapped around my booster bulb 27 is the electrical resistance heating element, 36. Wire 37 connects one end of the electrical heating element 36 to the manual switch 24. That same wire 37 is connected at the manual switch 24 to another wire 38 which connects to terminal 21 of the upper heating unit 19 and the terminal 21 of the lower heating unit 20.

Terminal 32 is connected by wire 39 to the other connection on the manual switch 24. The other end of the electrical heating element 36 is attached to wire 40 which connects to terminal 35 of the microswitch 33. Terminal 35 of the microswitch is in turn connected by wire 41 to the terminal 22 of the upper heating unit 19 and the terminal 22 of the lower heating unit 20. Output terminal 31 of the power supply 30 is connected by wire 42 to the terminal 34 of the microswitch.

In operation, the housewife turns on the manual switch 24, actuating the heating cycle, and setting the control knob 23 to the proper temperature setting, whether this be 400° Fahrenheit for cooking or 860° for cleaning the oven.

The microswitch 33 is in the on position, with the switch lever 43 extended and not touching the stud 44 on the diaphragm 29, since the diaphragm 29 is contracted to its full line position.

With the manual switch on and the micro switch 33 on, power will flow to the two oven heating units 19 and 20 through the terminals 21 and 22 from the power supply 30. At the same time power will flow through the resisting heating element 36 wrapped around the booster bulb 27. The fluid which fills the two bulbs 26 and 27, will begin to get warmer.

The fluid in the booster bulb 27 will get warmer and expand due to the action of the heating element 36 wrapped around the bulb. The fluid in the bulb 26 will get warmer and expand due to the heating of the oven chamber, as the heating units 19 and 20 heat up the chamber 10. The rear wall 11 of the chamber will get hotter and hotter and transmit that heat to the bulb 26. Since the bulb 26 and bulb 27 are linked in series, both will contribute to the volumetric expansion of the diaphragm 29.

The diaphragm 29 will thereupon expand to its dotted line position 29', moving the stud 44 to the dotted line position 44', and actuating the microswitch 33 to cut off the power from the power supply 30 to the upper and lower heating units 19 and 20 as well as the resistance heating element 36, when the given preset temperature T' is reached.

At this point the resistance heating element 36 and the upper and lower heating units 19 and 20 will all begin to cool, just as the oven chamber 10 will begin to cool, since there is no power flowing to the heating units or resistance element. The fluid in the bulbs 26 and 27 will cool and contract, allowing the fluid in the diaphragm 29 to contract. Thus the diaphragm 29 will return from its dotted line position 29' to its full line position 29. Similarly the stud 44 on the diaphragm will return to its full line position 44 from its dotted line position 44'. In the full line position the stud does not contact the switch lever 43, and thus the lever 43 will be moved outward. In this condition the micro switch will go to the on condition and power will again flow to the heating units 19 and 20 and to the resistance heating element 36 in contact with the booster bulb 27.

Ordinarily the limits between which the on and off conditions of a single bulb thermostat arrangement will cycle, with that single bulb placed inside the oven, would be seventy to eighty degrees Fahrenheit. In such a typical arrangement the total travel of the stud 44 when the diaphragm 29 is expanding from 29 to 29' will be of the order of three thousandths of an inch.

Now in FIGURE 3 I show what happens when I remove the single bulb 26 to the outside of the rear wall 11 of the oven. In this case I have measured with thermocouples the temperature versus time changes of both the bulb 26 and the oven chamber 10. It will be understood that I made this experiment with an empty oven, and without the booster bulb. A thermocouple was placed in the oven chamber 10 and another thermocouple was placed on the bulb 26, which was placed in intimate contact with the outside of the rear wall 11 of the oven.

FIGURE 3 shows that for a given setting of the temperature control knob 23, the "amplitude" of the temperature swings in the oven chamber were some 170° Fahrenheit, or somewhat over twice the acceptable practice. The "amplitude" is defined as the extremes of temperature which are required to make the thermostat control system cycle on and off. When thermostat engineers speak of the "differential" they are generally speaking of one-half the amplitude.

In the same physical setup mentioned previously as my first experiment, I measured the bulb temperature at bulb 26. This temperature fluctuated about a midpoint temperature of about 350° Fahrenheit, and had an amplitude of some 25° Fahrenheit. It must be remembered that this was for an oven control setting of 400° Fahrenheit. At the same time, from FIGURE 3 it will be seen that the oven chamber temperature for that control setting of 400° Fahrenheit went as high as 485° Fahrenheit and as low as 315° Fahrenheit. Such an oven control is not acceptable because of the relatively huge differential. While it is possible to cook with such an oven, the regulation of temperature is not acceptable to commercial standards. It might be satisfactory to a cook who was used to cooking with a wood stove, but modern recipes and modern cookbooks specify temperatures which require regulation within some seventy or eighty degrees amplitude to receive commercial acceptance.

At the same time it should be mentioned that the difference between the two mean or mid-points in the FIGURES 3 and 4 is called the "lag." Here it is the difference between 400° and 350° Fahrenheit. In general the lag becomes greater at higher temperatures. The reason for the lag is that the heat must go through the rear wall 11 before it reaches the bulb 26.

Next, in FIGURES 5 and 6 I exhibit the graphs for the next experiment. This is the same experiment as the previous one, however the "booster" bulb and its associated circuitry have been added. The physical setup here is that the oven is empty. The oven temperature control knob 23 is again set at 400 and with my invention of FIGURES 1 and 2, the oven is run.

Here, in FIGURE 5 it will be seen that the chamber temperature again cycles around a midpoint of 400° Fahrenheit. However the amplitude of the cycling, that is the extremes of temperature which actuate the power supply to go on and off, is reduced to 25° Fahrenheit. This is incredible to thermostat engineers when they first see it, since the bulb 26 is not in the chamber.

Also in FIGURE 6 it will be seen that the temperature of the bulb 26 cycles around 350° Fahrenheit, however the amplitude of the cycling is reduced to a mere 2° Fahrenheit. The lag or difference between the two midpoints is still 400° minus 350° or 50° Fahrenheit. This lag can be compensated for simply by offset calibration, familiar to all thermostat engineers.

It will be understood that all the figures showing temperature variations apply once the whole oven and bulb have been heat saturated. There is an overshoot phenomenon which is familiar to all thermostat engineers and which is necessary to saturate the walls with heat and stabilize the measurements. The same overshoot at the beginning of measurements is also necessary for good cooking, because the chamber gets hotter and hotter but the walls of the chamber absorb the heat until they reach the temperature setting also. When they become saturated, the temperature regulation becomes accurate.

In FIGURES 7 and 8, I show the effect of trying to heat clean an oven which is empty. The conditions here are that there is no "booster" bulb (similar to the physical setup for FIGURES 3 and 4). The chamber and bulb 26 temperatures are again measured with thermocouples. The oven control setting knob is set at 860° Fahrenheit. The chamber temperature as shown in FIGURE 7 fluctuates about the midpoint of 860° with variations in temperature having an amplitude of some 140°. The chamber temperature goes as low as 790° Fahrenheit, and as high as 930° Fahrenheit.

The bulb temperature in FIGURE 8 shows that the bulb fluctuates about a midpoint temperature of 700° Fahrenheit and that the variations in temperature have an amplitude of some 25° Fahrenheit. This shows that an acceptable oven can be built which will have control of the heat-cleaning cycle for the reason that, as the bulb 26 is outside the rear wall 11, it never gets hot enough to break down the normal organic hydraulic filler fluids used in such a hydraulic circuit. Although the oven becomes as hot as 930° Fahrenheit, the bulb never gets hotter than 725° Fahrenheit.

Finally, in FIGURES 9 and 10, I show the use of the booster bulb with an empty oven on the heat-cleaning cycle. The results are striking. In FIGURE 9 it is seen that the chamber temperature fluctuates about a midpoint temperature of 860° Fahrenheit, however with the use of the booster bulb 27, as shown in FIGURE 2, the ampli- tude of the temperature variations is diminshed to 20° Fahrenheit.

Similarly, in FIGURE 10 it will be seen that the temperature of the bulb fluctuates within amplitude of only 2 degrees Fahrenheit around a midpoint temperature of 700° Fahrenheit. The fluid in the bulb never rises to more than approximately 701° Fahrenheit. This is an illustration of a use of 700° filler fluids to regulate an oven operating at between 850° and 870°. The bulb 26 never gets hot enough to decompose or burn up the fluid. The temperature regulation therefore stays accurate and the device is extremely simple and efficient in assembly.

It will be noted that the lag between the midpoint temperatures of FIGURES 9 and 10 is 160° Fahrenheit. This is what makes the device acceptable in operation. Here the lag is utilized to protect the bulb from the extreme temperatures used in cleaning the oven chamber. By choosing the correct "lag" it will therefore be possible to control chamber temperatures through a remotely situated sensing element, namely the bulb 26.

It will be understood that many changes, modifications, and variations may be made in the details of the construction and arrangement of parts within the scope of the appended claims without departing from the spirit of the invention.

I claim:

1. In an oven control system utilizing hydraulic fluid controls to operate at a control temperature above the breakdown temperature of the fluid employed for an oven having a chamber composed of walls, a heating unit disposed within said chamber and an oven door, and a power supply, a hydraulic diaphragm bulb for controlling the temperature of said chamber by controlling the power input from said power supply to said heating unit, said diaphragm bulb being located outside said chamber and fixedly secured in immovable contact with one wall of said chamber, and said bulb being filled with expansible fluid having a break-down temperature below the upper limit of the operating temperature range of the oven to sense by contact conduction the heat output of said heating unit, a microswitch in series connection with and controlling the flow of power from said power supply, a second diaphragm bulb in series with said first bulb and similarly filled with said expansible fluid, and positioned at a distance away from said chamber walls and insulated therefrom, a bulb heating element in intimate contact with the second diaphragm bulb, said heating element being actuated by power from said power supply and controlled by said microswitch, an expansible diaphragm in series with both of said hydraulic bulbs and expansible to actuate said microswitch.

2. In an oven control system utilizing hydraulic fluid controls to operate at control temperatures above the breakdown temperature of the fluid employed for an oven having a chamber composed of walls and provided with surrounding insulation, a heating unit disposed within said insulated chamber and an oven door, and a power supply, a hydraulic diaphragm bulb for controlling the temperature of said chamber by controlling the power input from said power supply to said heating unit, said diaphragm bulb being located outside said chamber and fixedly secured to a wall of said chamber in the insulation surrounding said chamber, and said bulb being filled with expansible fluid having a breakdown temperature below the upper limit of the temperature range of operation of the oven to sense the heat output of said heating unit, and in contact with said wall, a manual control switch to actuate the power flowing from said power supply to said heating unit, a microswitch in series connection with said power supply and said manual control switch, a second diaphragm bulb in series with said first bulb and similarly filled with said expansible fluid, and positioned at a distance away from said chamber walls and insulated therefrom, a bulb heating element in intimate contact with said second diaphragm bulb, said heating element being actuated by power from said power supply and controlled by said microswitch, an expansible diaphragm in series with both of said hydraulic bulbs and expansible to actuate said microswitch.

3. In an oven control system utilizing a hydraulic fluid control to operate at a control temperature above the breakdown temperature of the fluid employed for an oven having a chamber composed of rear, top, side and bottom walls, said walls being surrounded by insulating material, and having heating units disposed within said insulated chamber, and an insulated oven chamber door, and a power supply, said oven control system being used to actuate said heating units within said oven chamber raising the temperature within said chamber to the range from 750° Fahrenheit to 950° Fahrenheit for the purpose of decomposing and degrading any food residues in said chamber and thereby cleaning said chamber.

a hydraulic diaphragm bulb immovably attached to a wall of said chamber for controlling the temperature of said chamber between 750° Fahrenheit and 950° Fahrenheit, said bulb being located outside said oven chamber and within the insulating material surrounding said chamber walls, and surrounded by said insulation material, said bulb being filled with expansible hydraulic fluid having a breakdown point below 750° Fahrenheit, and sensing the temperature of said chamber through said chamber wall, said hydraulic diaphragm bulb fluid being insulated from temperatures of 750° Fahrenheit to 950° Fahrenheit by said insulation material in said oven surrounding said walls of said oven.

4. In an oven control system utilizing hydraulic fluid controls to operate at a control temperature above the breakdown temperature of the fluid employed, for an oven having a chamber composed of rear, top, side and bottom walls and an oven door, said walls being surrounded by insulating material, and having heating units disposed within said insulated chamber, and an oven power supply, said oven control system being employed to actuate said heating units within said oven chamber and thereby raising the temperature within said chamber to the range from 750° Fahrenheit to 950° Fahrenheit and maintaining said temperature within said range for a period of over two hours for the purpose of decomposing and degrading any food residues in said chamber and thereby cleaning said chamber, by burning completely said residues, a hydraulic diaphragm bulb immovably attached to a wall of said chamber for controlling the temperature of said chamber between 750° Fahrenheit and 950° Fahrenheit, said bulb being located on the outside of one of said walls of said chamber and sensing by contact the temperature of said chamber through said wall, said bulb being filled with expansible hydraulic fluid having a breakdown point below 750° Fahrenheit, a manual control switch to actuate the power flowing from said power supply to said heating units, a microswitch in series connection with said power supply and said manual control switch, a second diaphragm bulb in series hydraulic connection with said first bulb and similarly filled with the same expansible fluid, and positioned at a distance from said chamber walls and insulated therefrom, a bulb heating element in intimate contact with said second diaphragm bulb, said heating element being energized by power from said power supply and controlled by said microswitch so that said heating element is active when said heating units are energized by said power supply, an expansible diaphragm in series with both of said hydraulic bulbs and expansible to actuate said microswitch in response to changes in temperature detected by said diaphragm bulb on the outside of said chamber.

5. In an oven control system for an oven having an oven chamber composed of a rear, a top, two side walls, a bottom wall and an oven door, said walls being surrounded by insulating material, and having heating units disposed within said insulated chamber, and an oven power supply, said oven control system being employed to energize said heating units within said oven chamber both through the normal cooking range from 150° Fahrenheit through 550° Fahrenheit, and also to the range from 750° Fahrenheit to 950° Fahrenheit in a cleaning cycle extending for a period of over two hours for the purpose of decomposing and degrading all food residues in said oven chamber and thereby cleaning said chamber, by completely destroying with heat all said residues at said elevated temperature range, a manual control switch to actuate and energize said heating units by means of power from said power supply, a temperature control knob for selecting and setting said temperature for normal cooking and for the elevated temperature cleaning cycle, a hydraulic diaphragm bulb immovably attached to a wall of said chamber for controlling the temperature of said chamber between 150° Fahrenheit and 950° Fahrenheit, said bulb being located on the outside surface of one of said walls of said chamber, and sensing the temperature of said chamber through said wall of said chamber by contact, said bulb being filled with expansible hydraulic filler fluid having a breakdown point below 750° Fahrenheit, a microswitch in series connection with said power supply and said manual control switch, a second diaphragm bulb in series hydraulic connection with said first bulb and similarly filled with hydraulic filler fluid having a breakdown point below 750° Fahrenheit, a bulb heating element in intimate contact with said second diaphragm bulb, said heating element being energizable by power from said power supply and controlled by said microswitch so that said heating element is activated when said heating units are energized by said power supply, an expansible diaphragm in series with both of said hydraulic bulbs and containing and activated by said hydraulic filler fluid having a breakdown point below 750° Fahrenheit, said diaphragm controlling said microswitch in response to changes in temperature detected by said diaphragm bulb on the outside of said oven chamber, to energize both said heater units, and said heater element on said second diaphragm bulb.

References Cited

UNITED STATES PATENTS

| | | | |
|---|---|---|---|
| 2,428,642 | 10/1947 | Weeks | 219—513 X |
| 2,611,850 | 9/1952 | Walton | 219—511 |
| 3,293,411 | 12/1966 | Dills | 219—393 |

FOREIGN PATENTS 1,114,872  12/1955  France.

RICHARD M. WOOD, *Primary Examiner.*

C. ALBRITTON, *Assistant Examiner.*